United States Patent [19]

Viegas

[11] Patent Number: 4,878,360
[45] Date of Patent: Nov. 7, 1989

[54] AIR DELIVERY SYSTEM FOR A TRANSPORT REFRIGERATION UNIT

[75] Inventor: Herman H. Viegas, Bloomington, Minn.

[73] Assignee: Thermo King Corporation, Minneapolis, Minn.

[21] Appl. No.: 270,861

[22] Filed: Nov. 14, 1988

[51] Int. Cl.$^4$ .............................................. B60H 1/32
[52] U.S. Cl. .................................... 62/239; 62/323.4; 62/429; 417/212; 474/133
[58] Field of Search ....................... 62/239, 323.4, 429; 417/212, 362; 474/69, 70, 75, 101, 109, 111, 133, 135

[56] References Cited

U.S. PATENT DOCUMENTS

| | | | |
|---|---|---|---|
| 3,415,072 | 12/1968 | White | 62/429 X |
| 3,789,618 | 2/1974 | Feliz | 62/323.4 X |
| 4,551,986 | 11/1985 | Anderson et al. | 62/239 |
| 4,787,214 | 11/1988 | Stillwell | 62/323.4 X |
| 4,811,569 | 3/1989 | Welch et al. | 62/239 |

*Primary Examiner*—William E. Tapolcai

[57] ABSTRACT

An air delivery system for a transport refrigeration unit having a dual speed prime mover, a compressor, a condenser, an evaporator, and first and second air delivery blowers for the condenser and evaporator, respectively. The first blower is directly driven by the prime mover and the second blower is driven by an adjustable speed arrangement. The adjustable speed arrangement includes a fixed pulley connected to the second blower, a pulley having a variable, selectable pitch diameter which is biased towards its maximum pitch diameter, an idler pulley, a belt linking the fixed, variable and idler pulleys, and an actuator for moving the idler pulley to select desired pitch diameters of the variable pulley via tension in the linking belt which opposes the bias associated with the variable pulley.

5 Claims, 4 Drawing Sheets

AIR DELIVERY SYSTEM FOR A TRANSPORT REFRIGERATION UNIT

BACKGROUND OF THE INVENTION

1. Field of the Invention

The invention relates in general to transport refrigeration, and more specifically to air delivery systems for transport refrigeration units.

2. Description of the Prior Art

It is common in the transport refrigeration industry to have a dual speed prime mover, such as a Diesel engine, connected to drive a refrigerant compressor at a selected one of high and low speeds, such as 2200 RPM and 1400 RPM. The speed setting is responsive to the cooling or heating capacity demanded by a thermostat which compares the temperature of a served space with a temperature set point. If the condenser and evaporator blowers are directly driven by the engine, the air flow drops when the engine speed drops. This is desirable for the condenser blower, as the requirements on the condenser blower are reduced at the lower refrigeration capacity. This may or may not be desirable for the evaporator blower, depending upon the temperature set point. If the set point is set for unfrozen loads, such as produce, it is desirable to maintain a high air circulation rate in the served space at all times, regardless of compressor speed, in order to maintain a uniform temperature in the cargo and prevent "top freezing". If the set point is set for frozen loads, the temperature variation of the served space is not as critical, as long as all points of the cargo are well below the freezing point. Thus, reducing the air flow in the served space at the lower speed is beneficial, as the reduced power draw by the blower and the reduction of "fan heat" due to reduced compression and agitation of the air, translate into increased cooling capacity, adding as much as 10 to 15% capacity, and reduced fuel consumption as well.

Thus, while some systems include means for automatically maintaining the evaporator air flow constant regardless of compressor speed, this is not always advantageous, and can be a disadvantage.

It would be desirable, and it is the object of the present invention, to provide an air delivery arrangement for a transport refrigeration system in which the speed of the condenser blower is directly proportional to the speed of the prime mover, while the speed of the evaporator blower is independently variable, adjustable up and down with respect to the speed of the prime mover.

SUMMARY OF THE INVENTION

Briefly, the present invention is an air delivery system for a transport refrigeration unit which includes a prime mover having at least two operational speeds, such as a Diesel engine, a compressor, a condenser, an evaporator, a blower for the condenser, a blower for the evaporator, and an adjustable speed arrangement for the evaporator blower. As used herein, the term "blower" means any suitable air delivery unit, including centrifugal blowers and axial flow fans.

The adjustable speed arrangement includes a jack shaft driven by the prime mover having a fixed pulley which drives the condenser blower at a speed directly proportional to the speed of the prime mover, and a variable pulley. The variable pulley is linked by a belt which also links a pulley which drives the evaporator blower, and an idler pulley. The position of the idler pulley is controlled by a linear actuator to tension the belt and select the pitch diameter of the variable pulley which will provide the desired evaporator air flow for the temperature set point, at the current prime mover speed. If the prime mover speed changes, the linear actuator will select a new pitch diameter if the cargo requires a substantially constant volume of air. If the temperature set point is changed from a point above freezing, to one below freezing, or vice versa, the affect of a speed change may be varied to select different pitch diameters, or to maintain pitch diameters, as desired.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

U.S. Pat. No. 4,551,986, which is assigned to the same assignee as the present application, discloses a transport refrigeration unit of the type which may be modified to utilize the teachings of the invention, and this patent is hereby incorporated into the specification of the present application by reference.

Figure 1:
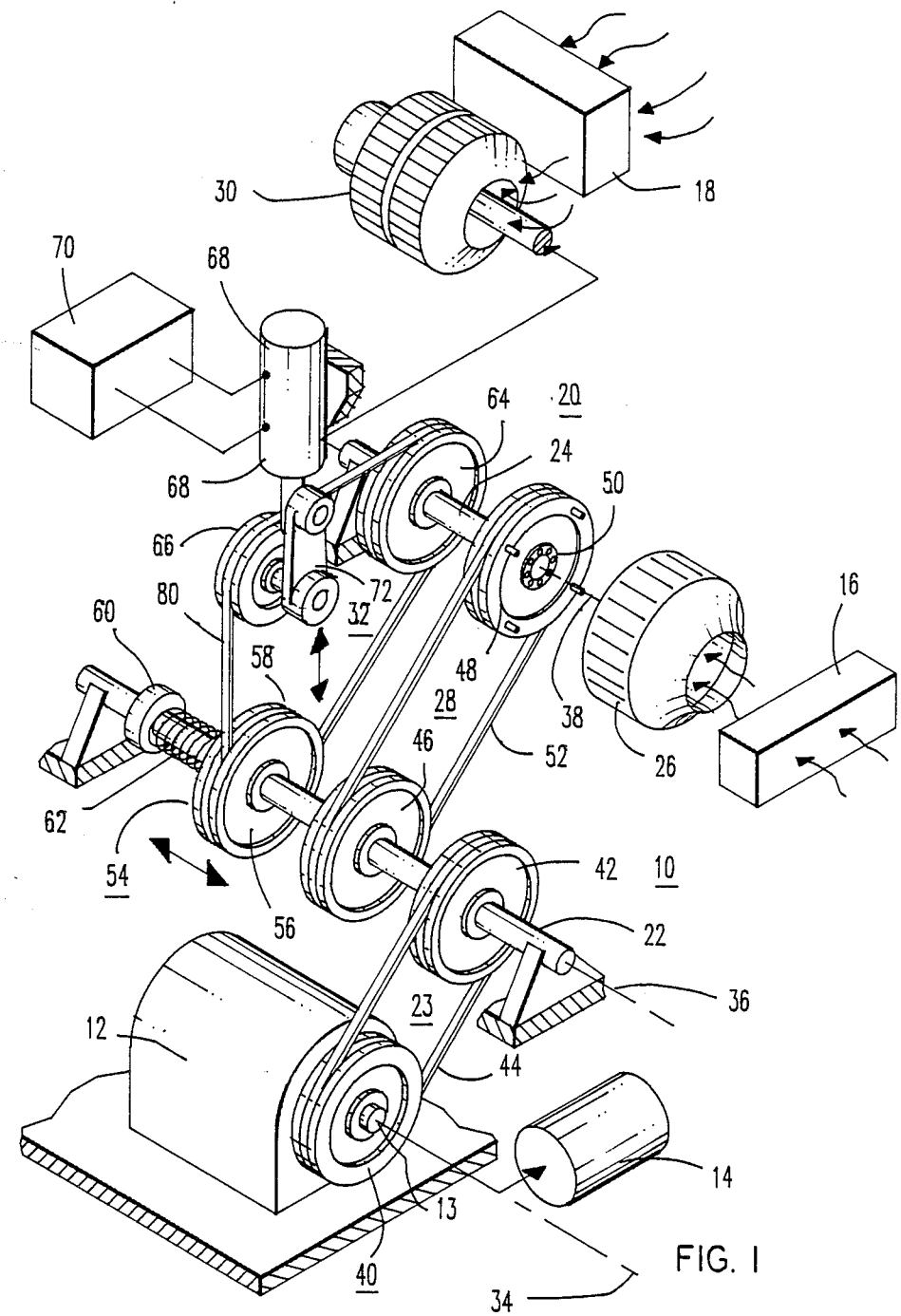
FIG. 1 is a perspective view of a transport refrigeration system having an air delivery arrangement constructed according to the teachings of the invention.

Referring now to the drawings, and to FIG. 1 in particular, there is shown a diagrammatic perspective view of a transport refrigeration system 10 constructed according to the teachings of the invention. Transport refrigeration system 10 includes a prime mover 12, which is preferably a Diesel engine having at least two solenoid selectable operational speeds, such as 2200 RPM and 1400 RPM, commonly called "high speed" (HS) and "low speed" (LS), respectively. Prime mover 12 includes a crankshaft 13 which drives a refrigerant compressor 14, either directly or via a pulley arrangement, and compressor 14 circulates refrigerant in a closed path which includes a condenser 16 and an evaporator 18. U.S. Pat. No. 4,735,055, which is assigned to the same assignee as the present application, may be referred to for a typical refrigerant circuit for transport refrigeration systems, and this patent is hereby incorporated into the specification by reference.

Transport refrigeration system 10 includes an air delivery arrangement 20 for the condenser 16 and evaporator 18 which includes a jack shaft 22 journaled for rotation and driven by the prime mover 12 by a drive arrangement 23, an output shaft 24 journaled for rotation, a condenser blower 26, a fixed speed drive arrangement 28 for driving the condenser blower 26 at a speed directly proportional to the speed of the prime mover 12, an evaporator blower 30, and an adjustable speed drive arrangement 32 for driving the evaporator blower at selectable speeds. Longitudinal axes 34, 36 and 38 of crankshaft 13, jack shaft 22 and output shaft 24, respectively, are all disposed in a predetermined spaced, parallel relation.

Drive arrangement 23 for driving jack shaft 22 includes a crankshaft pulley 40, a driven pulley 42 fixed to jack shaft 22, and a V-belt 44 which links or couples pulleys 40 and 42.

Drive arrangement 28 for driving condenser blower 26 at a speed directly proportional to the speed of prime mover 12 includes a driving pulley 46 fixed to rotate with jack shaft 22, a pulley 48 journaled for rotation about output shaft 24 via bearings 50, and a V-belt 52 which links pulleys 46 and 48.

Drive arrangement 32 for driving evaporator blower 30 at selectable speeds includes an adjustable or variable pulley 54 having a first pulley face 56 which is fixed to jack shaft 22, and a second pulley face 58 which is axially slidable upon jack shaft 22. A spring seat 60 is fixed to jack shaft 22, in spaced relation from pulley 54, and a spring 62 is disposed between seat 60 and the slidable face 58 of pulley 54, to bias pulley 54 towards the maximum pitch diameter. Drive arrangement 32 further includes a driven pulley 64 which is fixed to output shaft 24, and an idler pulley 66. Idler pulley 66 is driven in a guided path by a linear actuator 68, which may be electrical, as shown, or hydraulic. Control 70 provides signals for actuator 68, which control the position of an actuating rod 72 to which idler pulley 66 is mounted. As shown more clearly in FIG. 2, which is an enlarged elevational view of adjustable speed drive arrangement 32, the actuator rod 72 of actuator 68 may be connected to a link 74 via a pivot pin 76, and link 74 may be connected to the shaft 78 of pulley 66. A V-belt 80 links variable pulley 54, driven pulley 64 and idler pulley 66.

Figure 2:
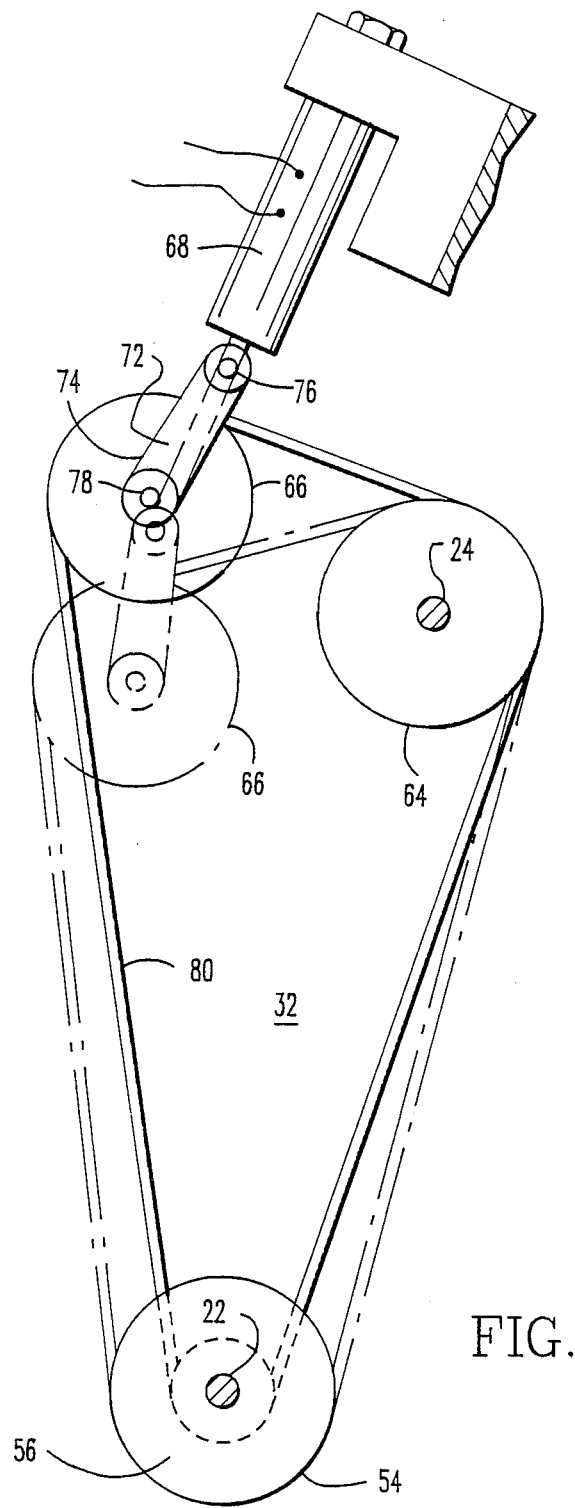
FIG. 2 is an elevational view of the variable speed portion of the air delivery arrangement shown in FIG. 1 illustrating the movement of an idler pulley by a linear actuator to select a desired pitch diameter of a variable pulley.

Linear actuator 68 is controllable over a predetermined stroke to control the position of idler pulley 66, the tension in V-belt 80, and the effective pitch diameter of variable pulley 54. As shown in FIG. 2, when the linear actuator 68 is at one end of its stroke in which actuator rod 72 has the shortest extension, the tension in V-belt 80 is the greatest, causing V-belt 80 to move pulley face 58 outward against the bias of spring 62 to the minimum pitch diameter, which in turn provides the lowest speed for output shaft 24 which drives evaporator blower 30. The solid line positions of the movable elements of drive arrangement 32 in FIG. 2 illustrate the minimum pitch diameter condition just described.

When linear actuator 68 extends rod 72 to the maximum, the tension in V-belt 80 is reduced, spring 62 forces pulley face 58 towards face 56, the maximum pitch diameter of pulley 54 is achieved, and output shaft 24 is driven at the maximum speed for the currently used prime mover speed. This condition is shown in broken outline in FIG. 2.

Figure 3:
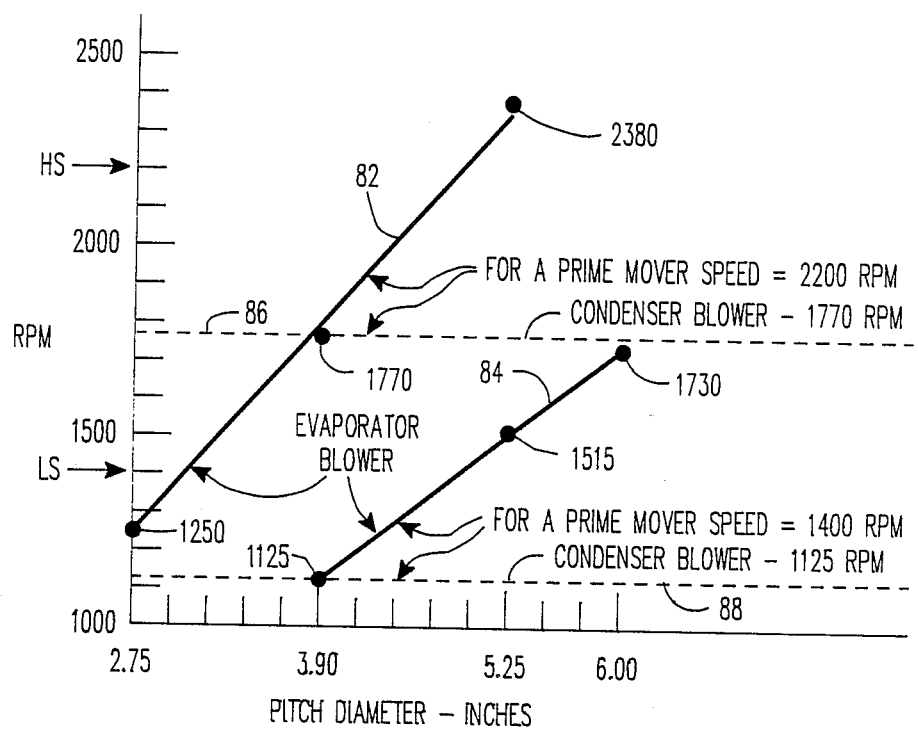
FIG. 3 is a graph which plots RPM versus pitch diameter, illustrating exemplary evaporator blower speeds available at high and low prime mover speeds.

FIG. 3 is a graph which plots RPM versus pitch diameter of pulley 54 at prime mover speeds of 2200 RPM and 1400 RPM, for an exemplary embodiment of the invention in which the pitch diameters of pulleys 40, 42, 46, 48 and 64 are 5.75 inches, 4.65 inches, 5.15 inches, 7.95 inches, and 6.0 inches, respectively. Solid curves 82 and 84 indicate practical speed ranges for evaporator blower 30 when prime mover 12 is operating at 2200 RPM and 1400 RPM, respectively. Broken line curves 86 and 88 indicate suitable constant condenser blower speeds at prime mover speeds of 2200 RPM and 1400 RPM, respectively.

IT will be noted that at the higher prime mover speed of 2200 RPM, the condenser blower 26 has a speed of 1770 RPM, and the speed of the evaporator blower 30 may be varied above and below 1770 RPM, as well as above and below the prime mover speed. At high speed the maximum pitch diameter, e.g., 6 inches, of pulley 54 is not used, with the pitch diameter being varied from 2.75 inches to 5.25 inches, providing an RPM that varies from 1250 RPM to 2380 RPM. A pitch diameter of 3.9 inches will provide an RPM for output shaft 24 substantially the same as the RPM of the condenser blower 26. Linear actuator 68 may be controlled using a small number of steps to provide the points indicated in the graph, or it may be controlled using many steps to provide many more operational pitch diameters, as desired.

At the lower prime mover speed of 1400 RPM, the condenser blower 26 has a speed of 1125 RPM, and the speed of the evaporator blower 30 may be controlled above and below the prime mover speed of 1400 RPM, i.e., from 1125 RPM, the same as the condenser blower speed, using the 3.9 inch pitch diameter, to a speed of 1730 RPM using the maximum 6 inch pitch diameter. The smallest pitch diameter 2.75 inches is not used during the low prime mover speed. Thus, for example, if it is desired to provide a large volume of air flow for a cargo of fresh produce, a pitch diameter of 5.25 or 3.9 inches may be selected when prime mover 12 is operating at high speed, changing to a pitch diameter of 6 inches when the prime mover speed is changed to low speed. The choice between 5.25 and 3.9 inch pitch diameters at high speed may be made dependent upon the set point selected. For set points above but relatively close to freezing, the 5.25 inch pitch diameter may be selected, while set points above about 50° F., for example, may be used to select the 3.9 inch pitch diameter, to limit the load on prime mover 12.

Figure 4:
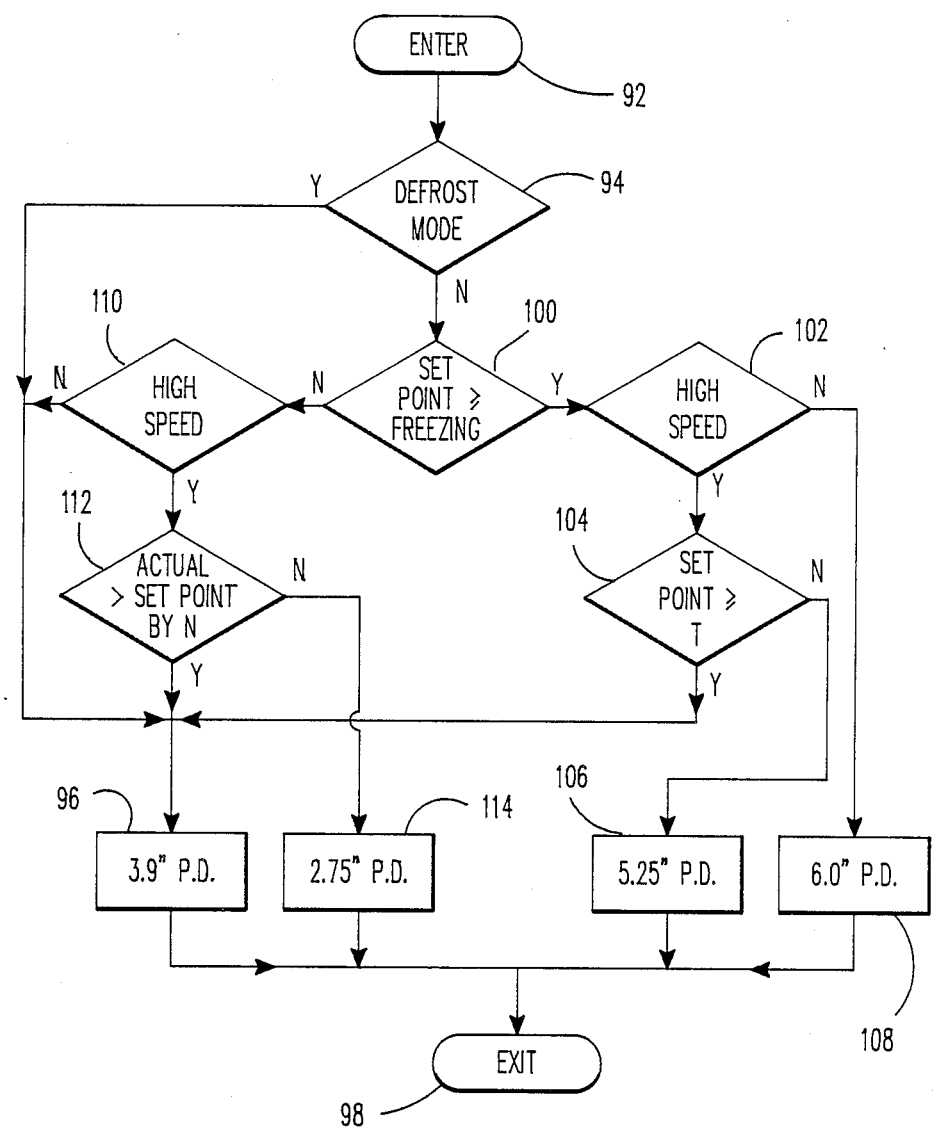
FIG. 4 is a flow diagram of an exemplary control algorithm which may be used to select the position of the linear actuator which in turn selects the pitch diameter of the variable pulley shown in FIGS. 1 and 2.

FIG. 4 is an exemplary control algorithm or program 90 which may be used by control 70 to control the position of linear actuator 68, which in turn selects a pitch diameter of pulley 54 and the speed of evaporator blower 30. Program 90 is entered at 92 and step 94 checks to see if refrigeration system 10 is in a defrost mode. If system 10 is in defrost, a small pitch diameter is required and step 96 outputs a signal to linear actuator 68 which selects the 3.9 inch pitch diameter, for example. The program then exits at 98 until it is called again, which may be several times a second.

If refrigeration system 10 is not in defrost, step 100 determines if the temperature set point has been set above freezing, i.e., above 32° F. If it is set above freezing, the program advances to step 102 which determines if the prime mover 12 is operating at high speed. If it is, step 104 if engine load limiting is required by checking to see if the selected temperature set point is equal to above some predetermined relatively high value T, such as 50° F. If the set point is relatively high, compressor 14 is required to pump more pounds of refrigerant per minute, increasing the load on prime mover 12. Thus, to limit engine loading, the fan load is reduced by proceeding to step 96 which selects the 3.9 inch pitch diameter. If the set point is below T, a higher fan load is acceptable and step 104 advances to step 106 which outputs a signal to linear actuator 68 which selects a pitch diameter of 5.25 inches. The program then exits at 98.

If step 102 finds that the prime mover 12 is operating at low speed, step 108 selects the 6.0 inch pitch diameter.

When step 100 finds that the set point has been selected to control a frozen load, step 100 proceeds to step 110 which checks the prime mover speed. If prime mover 12 is operating at low speed, step 96 selects the 3.9 inch pitch diameter. If step 110 finds the prime mover operating at high speed, step 110 proceeds to step 112 to determined how close the actual load temperature is to set point. If the actual temperature exceeds set point by a predetermined value N, step 96 selects the 3.9 inch pitch diameter, and if the actual temperature of the served space is closer to set point than N, step 114 selects the 2.75 inch pitch diameter.

In summary, there has been disclosed a new air delivery system for a transport refrigeration unit which provides a wide latitude of control over the evaporator blower speed, enabling the proper or optimum speed to be selected for both fresh and frozen loads, at different prime mover speeds.

What is claimed:

1. An air delivery system for a transport refrigeration unit having a prime mover, a condenser, an evaporator, and condenser and evaporator air delivery means, comprising:
    a first shaft driven by the prime mover,
    first and second pulleys fixed to said first shaft having fixed and variable pitch diameters, respectively,
    a second shaft spaced from said first shaft,
    a third pulley journaled for rotation on said second shaft,
    said third pulley driving the condenser air delivery means,
    a fourth pulley fixed to said second shaft,
    said fourth pulley driving the evaporator air delivery means,
    an idler pulley,
    actuator means for selectively adjusting the position of said idler pulley,
    first belt means linking said first and third pulleys to drive the condenser air delivery means at a speed directly proportional to the speed of the prime mover,
    and second belt means linking said second, fourth and idler pulleys,
    said actuator means adjusting the position of said idler pulley to select pitch diameters of said second pulley which provide speeds for the evaporator air delivery means which may be varied relative to the speed of the prime mover.

2. The air delivery system of claim 1 including means biasing said second pulley towards a maximum pitch diameter.

3. The air delivery system of claim 1 wherein the second pulley includes a movable and a fixed face, and mans biasing the movable face towards the fixed pulley face.

4. The air delivery system of claim 1 wherein the first shaft is driven by the prime mover via pulleys on the prime mover and first shaft linked by a belt.

5. The air delivery system of claim 1 wherein the prime mover is an internal combustion engine having first and second operational speeds, with predetermined pitch diameters of the second pulley providing a substantially constant speed of the second air delivery means at the first and second operational speeds of the prime mover.

* * * * *